United States Patent Office 3,493,338
Patented Feb. 3, 1970

3,493,338

PROCESS FOR PREPARING FERROMAGNETIC MATERIALS

William T. Hicks and Howard W. Jacobson, Wilmington, Del., assignors to E. I. du Pont de Nemours and Company, Wilmington, Del., a corporation of Delaware No Drawing. Filed Sept. 28, 1966, Ser. No. 582,535
Int. Cl. C01g 37/02
U.S. Cl. 23—145 7 Claims

ABSTRACT OF THE DISCLOSURE

Ferromagnetic $CrO_2$, useful for the manufacture of magnetic recording members, is produced by heating a chromium oxide having a chromium valence greater than four at 250°–375° C. and at a pressure no greater than one atmosphere while continuously supplying 1–10 volume precent of nitric oxide and 99–90 volume percent of oxygen, nitrogen, or argon, said gasses being admixed prior to passing the resulting gaseous mixture over the chromium oxide to form ferromagnetic chromium dioxide.

This invention is related to the production of ferromagnetic chromium dioxide ($CrO_2$). More particularly, this invention relates to a low pressure process for preparing ferromagnetic chromium dioxide.

The preparation of ferromagnetic chromium oxide by different processes is known to the art as evidenced by several publications such as U.S. Patents 2,956,955 and 3,034,988. The prior art discloses the synthesis of chromium dioxide, its modification by use of various additives, and its incorporation as a magnetic material for use in recording tapes and devices, etc. In these cases, several methods for preparing the ferromagnetic oxide and modified oxide are presented; however, most of these methods require the employment of high pressure equipment suitable for pressures up to about 500 atmospheres while the preferred pressure required for these techniques is in the range of about 200–500 atmospheres. The most commonly employed procedure described in these cases requires the decomposition of chromium trioxide in aqueous media at pressures ranging from 200–300 atmospheres and temperatures ranging from 200–500° C.

Alternative methods for producing ferromagnetic $CrO_2$ are disclosed in U.S. Patents 3,074,778 and 3,078,147 wherein chromyl chloride is decomposed on substrates of fibrous inorganic materials or on impure chromium dioxide substrates at atmospheric pressures in an oxygen atmosphere at a temperature ranging from 300–500° C. Still another procedure for producing ferromagnetic chromium dioxide is taught in U.S. Patent 3,117,093 in which the higher oxides of chromium of the general formula $Cr_xO_y$ wherein the ratio of $2_y$ to $x$ ranges between 4 and 6 are heated in aqueous acid media at pressures ranging between 50 and 3000 atmospheres at temperatures of 250–500° C.

With the discovery of a ferromagnetic chromium dioxide having suitable magnetic properties and uniform small particle size which makes it useful in certain applications in the manufacture of magnetic recording tapes, magnetic memory recorders, or for computers, generator elements and so forth, arose the need for alternate, less-expensive techniques for its manufacture. The oxides of chromium, which have magnetic properties, are generally uniform, small particles of tetragonal crystal structure, whose average length is not more than 10 microns with no more than 10% of the particles being longer than 10 microns. These particles contain 58.9–61.9% chromium and exhibit an X-ray diffraction pattern which analysis shows to correspond in its entirety to a tetragonal crystal structure having cell constants of $a_0=4.41\pm0.10$ A. and $c_0=2.90\pm0.10$ A. and are disclosed and described in Arthur U.S. Patent 2,956,955.

Magnetic properties which are particularly important and which render the products of this invention useful in a variety of applications are the intrinsic coercive force ($H_{ci}$), saturation per gram or sigma value ($\sigma_s$), and the remanence ratio $(\sigma_r)/(\sigma_s)$, that is the ratio of the retentivity or remanence per gram to the saturation per gram. Retentivity and saturation are defined on pages 5 through 8 of Bozorth's "Ferromagnetism," D. Van Nostrand Company, New York, 1951. The sigma values given herein are determined in a 4400 gauss field on apparatus similar to that described by T. R. Bardell on pages 226–228 of "Magnetic Materials in the Electrical Industry," Philosophical Library, New York, 1955. The definition of the intrinsic coercive force ($H_{ci}$) is given in Special Technical Publication No. A–5 of the American Society for Testing Materials, entitled "Symposium On Magnetic Testing," 1948, pages 191–198. The values for intrinsic coercive force given herein are determined in a DC ballistic-type apparatus which is a modified form of the apparatus described by Davis and Hartenhein in The Review of Scientific Instruments, volume 7, 147 (1936).

For the preparation of high quality recording members, it is preferred that the magnetic material possess a saturation per gram or sigma value, $\sigma_s$, of at least 60 emu per gram. Materials having a saturation per gram above 65, and especially those having a saturation above 75, yield particularly desirable products.

The procedure of this invention is carried out as described in the claims. Preferably a desired amount of higher oxide of chromium, usually chromium trioxide, having in general a valence greater than 4 and specific amounts of modifying metals in the form of their oxides or convenient compounds, such as antimony oxides, are placed in corrosion and heat-resistant containers, such as ceramic, stainless steel, and platinum boats and inserted into a suitable furnace. The temperature of the furnace is gradually raised to the range of 250–375° C.; and as soon as the heating begins, a mixture of nitric oxide and oxygen, nitrogen or an inert gas, such as argon is continuously passed over the chromium mixture for periods of from ½ hour to about 10 hours at normal atmospheric pressures. The black crystalline product, upon cooling, is crushed lightly with suitable means and washed in water and actone and thereafter air dried. It is then suitable for use in testing for magnetic properties.

The chemicals used in preparing the ferromagnetic chromium oxide are usually of reagent grade quality, having a 99.0% minimum purity. Normally, chromium trioxide $CrO_3$ of this purity having a powdered, finely ground consistency is employed. However, other oxides such as $Cr_2O_5$ and $Cr_3O_8$ can be used if they are of equivalent quality with similar results obtainable. In addition to the higher oxides, a seed material composed of pure chromium dioxide, having good quality ferromagnetic properties can be employed as seed material upon which to grow larger crystals of chromium dioxide. Additives such as seed material and modifying reagents are incorporated in the reaction mixture. The chromium trioxide is placed into a blending device and thoroughly mixed prior to placing in the reactor.

Modifying reagents such as those described in U.S. Patents 2,923,683; 2,923,684; 2,923,685 and 2,885,365 can be comixed with the chromium oxide starting material. Suitable compounds, such as antimony trioxide or pentoxide, tin or tellurium metal or oxide, and suitable compounds of titanium, magnesium, iron, cobalt, nickel, ruthenium and alkali metals can be added. These materials have been found to enhance the magnetic properties of the oxide.

Chromium trioxide, when heated at normal atmospheric pressure in air or oxygen, decomposes to lower oxides of chromium below the tetrapositive valence state. It is very difficult to control the conditions of this decomposition such that the reduction stops at the tetrapositive valence state. It was found, however, that using a mild reducing agent, nitric oxide, this reduction or decomposition can be controlled such that large quantities of chromium dioxide are obtainable at low pressures. As will be demonstrated in the following examples, the decomposition of chromium trioxide, in the presence of oxygen and nitric oxide, where the nitric oxide is initially present in the range of 2 to 9 volume percent, and preferably in the range of 2½ to 4½ volume percent, will catalyze the decomposition of the trioxide or other higher chromium oxides to form a good yield of ferromagnetic chromium dioxide. The preferred gas mixture for reaction employing this invention is at a ratio of $NO/O_2$ in volume ratios of from 2/98 to 9/91. Other gas mixtures containing nitric oxide have been used and have resulted in the production of ferromagnetic chromium dioxide. These other mixtures which are useful are nitric oxide and nitrogen in the volume proportions of 1–10% nitric oxide, balance nitrogen, and nitric oxide and the balance being an inert gas such as argon in similar proportions. Although these gas mixtures are operable in the invention, the NO and $O_2$ mixtures stated above are preferred. A total pressure of one atmosphere is generally used. Strongly reducing gas mixtures such as, for example, carbon monoxide-carbon dioxide mixtures and hydrogen-$H_2O$ mixtures, sulfur dioxide-oxygen mixtures result only in the formation of nonmagnetic oxides, or in the last instance sulfates as, for example, chromium sulfate.

Since chromium trioxide when used as a starting material melts at about 200° C., and becomes solid as it starts to decompose, it is converted to the chromium dioxide under the atmospheres of the invention at temperatures ranging between about 250–375° C. with the preferred range being 275–350° C. The reaction rates occur more rapidly at the preferred temperatures than outside this range. It is sufficient to hold the reaction mixture under the above stated atmospheric conditions for periods of ½ to 10 hours to produce satisfactory results, while periods of from 1 to 2 hours are most generally employed.

More specifically, the process of this invention is illustrated by the following examples of its operation.

EXAMPLE I

Three grams of $CrO_3$ were weighed into a platinum boat 2 inches long, and the boat was placed in a 31-mm. Pyrex tube 3 ft. long. The boat was placed in a tube furnace so that the boat was centered and gas flow at normal atmospheric pressure was begun over the boat. The gas mixture comprised 3.5% by volume of NO and 96.5% by volume $O_2$. The total gas flow rate was set at 200 cc./min. The temperature of the furnace was increased from room temperature to 175° C. in 10 minutes then slowly increased through the melting point of $CrO_3$ to 225° C. in a period of 1 hour. The furnace was then more rapidly heated to 325° C. within 20 minutes. The furnace temperature was held at 325° C. for 2 hours while the gas flow was continued through the tube furnace at the same rate as given above. At the conclusion of the two-hour heating period, the platinum boat was removed from the furnace and was allowed to cool to room temperature in air. The weight loss of this sample was found to be 18.5% and the resulting product was a black crystalline material. This product was crushed in a mortar, was washed in water and in acetone, and was air dried before measurements were made of its magnetic properties. The following magnetic properties were found: $H_{ci}$=31Oe., $\sigma_s$=84.9 emu/gm., and $\sigma_r$=4.3 emu/gm.

Pure $CrO_2$ has been found to have a saturation-magnetization value of approximately 90 emu/gm. and since the saturation-magnetization may be considered to be roughly proportional to the quantity of $CrO_2$ present, the purity of the ferromagnetic product may be easily estimated. In this example, the amount of $CrO_2$ present calculated on this basis was found to be 94%. It was also found by X-ray diffraction analysis that $CrO_2$ was present in the tetragonal rutile structure. Faint lines were also present in the X-ray patterns consistent with a $Cr_2O_3$ content of approximately 5%.

EXAMPLE II

The following example will illustrate the preparation of an antimony-modified ferromagnetic chromium oxide of good ferromagnetic properties.

2.7 grams of $CrO_3$ and 0.3 gram of $Sb_2O_3$ were placed in a platinum boat and the boat placed at the center of a 31-mm. Pyrex tube furnace as described in Example I. Flow of $NO/O_2$ gas mixture of the same composition as given in Example I and at normal atmospheric pressure was connected through the Pyrex tube. Again, following the heating schedule as given in Example I, the furnace was heated to a temperature of 300° C. and this temperature maintained for 2 hours during which time the gas flow was continued through the tube furnace. At the conclusion of the two-hour heating period, the platinum boat with this contained sample was removed from the furnace and air cooled. The weight loss of this sample was found to be 17.2% of the original $CrO_3$ weight. The black crystalline product which resulted from this process was mortar crushed, washed in water and acetone, and air dried before being measured for magnetic properties.

The following magnetic properties were found on this sample: $H_{ci}$=114 Oe., $\sigma_s$=65.9 emu/gm., and $\sigma_r$=13.6 emu/gm.

The $CrO_2$ content of this sample was estimated as described in Example I and was found to be 73%. X-ray diffraction analysis showed strong lines of rutile-type $CrO_2$, and weak lines for $Sb_2O_3$. Since there was a slight displacement of the position of the $CrO_2$ lines, some solubility of the $Sb_2O_3$ in the $CrO_2$ crystalline lattice is indicated.

EXAMPLE III

The following example will describe the preparation of tellurium-modified ferromagnetic crystals of chromium oxide.

2.8 grams of $CrO_3$ were mixed with 0.150 gram of elemental tellurium crystals which had been crushed and passed through a 200-mesh screen. This crystalline mixture was placed in a platinum boat 2 inches long and the boat placed in a 31-mm. Pyrex tube furnace 3 ft. in length. Gas flow of a mixture of oxygen and NO in the same proportions as given in Example I and at normal atmospheric pressure was begun through the tube furnace over the boat containing the $CrO_3$/Te mixture. The furnace was heated to a temperature of 300° C. following the same heating schedule as is given in Example I. The temperature of the furnace was maintained for 1 hour at the 300° C. level with the continuation of the gas mixture passing through the tube. At the conclusion of this heating time, the platinum boat was removed from the furnace and allowed to cool to room temperature in air. The weight loss amounted to 17.4% of the original weight of the $CrO_2$ placed in the platinum boat. The black crystalline material which resulted from this treatment was crushed in a mortar, washed in water and acetone, and air dried before measurements of magnetic properties were made. The magnetic properties are: $H_{ci}$=49 Oe., $\sigma_s$=84.5 emu/gm., and $\sigma_r$=10.4 emu/gm.

X-ray diffraction analysis of this crystalline product showed only strong lines for $CrO_2$ in the rutile crystal structure. Since there was in this case no appreciable displacement of the lines from the normal $CrO_2$ pattern, there is indication of no appreciable solubility of the Te in the $CrO_2$ crystal lattice.

EXAMPLES IV THROUGH IX

In order to determine the effect of varying proportions of NO to $O_2$ in the gases introduced into the reaction tube in which the ferromagnetic crystals are formed, Examples IV through IX were carried out using the same procedure as is given in the above examples except to vary the ratio of NO to $O_2$ introduced to the tube.

Using the same procedure as given in Example I above, six additional samples of ferromagnetic $CrO_2$ were prepared. The proportion of NO to $O_2$ used in these experiments varied between 1.5 volume percent and 33 volume percent. In each case, the sample was heated at a temperature of 275° C. at times ranging from 8 to 20 hours. These samples were not given a water and acetone wash after synthesis. Such a washing treatment would, however, have caused a slight improvement in magnetic properties. Results which were obtained on ferromagnetic oxide samples prepared under these conditions are summarized in Table I which follows.

In carrying out this invention, the rate at which the reactants are heated to the final holding temperature is not found to be particularly critical. However, it has been found that if the rate of heating is relatively slow while the temperature is passing through the range comprising the melting point of $CrO_3$ (about 200° C.) a greater porosity results within the material, and a better yield of ferromagnetic crystals is obtained as the end product.

The process of this invention provides good yields of ferromagnetic chromium dioxide which are useful in magnetic recording members. Additionally, this process provides a convenient manner to prepare the ferromagnetic chromium dioxide by low pressure synthesis.

The process of this invention can be operated with nitric oxide as essentially the only gas present during the reaction. This takes place by reducing the pressure in the reaction chamber to remove a substantial portion of the ambient air and then replacing about 1 to 10% by volume of the air with nitric oxide.

When mixtures of nitric oxide and another gas are utilized in this invention, the nitric oxide is the critical ingredient and the other gas is primarily a diluent. Any gas can be used as the diluent if it does not interfere with the reducing action of the nitric oxide and it causes no further reduction of the ferromagnetic $CrO_2$ once the $CrO_2$ is formed.

The embodiments of the invention in which an exclusive property or privilege is claimed are defined as follows:

1. A process for preparing ferromagnetic chromium dioxide which comprises heating a chromium oxide having a chromium valence of greater than four to a temperature of about 250° C. to 375° C. while continuously supplying 1–10 volume percent of nitric oxide and 99–90 volume percent of oxygen, nitrogen or argon, said gases being admixed prior to passing the resulting gaseous mixture at a pressure no greater than about 1 atmosphere over said chromium oxide as said heating occurs, continuously removing gases from the reacting zone and thereafter recovering the ferromagnetic chromium dioxide that is formed.

TABLE I

[$CrO_3$ reactions at 275° C. as function of $NO/O_2$ gas composition]

| Ex. | Vol percent NO introduced (balance oxygen) | Holding time at temp. (hrs.) | Wt. loss (percent) | $H_{ci}$ (Oe.) | $\sigma_s$ (emu/gm.) | $\sigma_r$ (emu/gm.) | Wt. percent $CrO_2$ |
|---|---|---|---|---|---|---|---|
| IV | 33 | 8 | 23.8 | | 0 | | 0 |
| V | 9 | 20 | 20.7 | 28 | 24.2 | 0.67 | 27 |
| VI | 5 | 12 | 19.9 | 31 | 54.9 | 1.61 | 61 |
| VII | 3.5 | 10 | 18.1 | 28 | 60.5 | 1.84 | 67 |
| VIII | 2.5 | 9 | 19.7 | 31 | 59.6 | 1.96 | 66 |
| IX | 1.5 | 8 | 18.2 | 0 | 10.3 | 0 | 11 |

EXAMPLES X THROUGH XIII

In order to determine the effect of variations in temperature in the preparation of ferromagnetic $CrO_2$ product according to this invention, four additional samples were prepared using a 3.5% NO-96.5% $O_2$ mixture and heating the samples for varying lengths of time at temperatures of from 275° C. to 350° C. These samples were not given a water and acetone wash after synthesis. Such a washing treatment would, however, have caused a slight improvement in magnetic properties. The ferromagnetic properties which were obtained on the products of these examples are listed in the Table II which follows.

2. A process as defined in claim 1 where said chromium oxide is heated for ½ hour to 10 hours.

3. A process as defined in claim 2 where said temperature is about 275° C. to 350° C.

4. A process as defined in claim 3 where said chromium oxide is chromium trioxide.

5. A process as defined in claim 3 where said heating is slowly increased until said temperature range is reached.

6. A process as defined in claim 3 where said gases supplied are nitric oxide and oxygen.

TABLE II

[$CrO_3$ reaction in 3.5% NO/96.5% $O_2$ atmosphere as function of temperature (heating rates as given in Example I)]

| Ex. | Holding time at temp. (hrs.) | T. (° C.) | Wt. loss (percent) | $H_{ci}$ (Oe.) | $\sigma_s$ (emu/gm.) | $\sigma_r$ (emu/gm.) | Wt. percent $CrO_2$ |
|---|---|---|---|---|---|---|---|
| X | 17.5 | 275 | 20.4 | 31 | 45.8 | 1.2 | 51 |
| XI | 2 | 300 | 18.9 | 38 | 80.4 | 3.3 | 89 |
| XII | 2 | 325 | 19.2 | 37 | 75.0 | 3.5 | 83 |
| XIII | 1 | 350 | 19.2 | 33 | 72.3 | 3.4 | 80 |

7. A process as defined in claim 6 where said gases supplied constitute 2 to 9 percent by volume of nitric oxide, the remainder being oxygen.

References Cited

UNITED STATES PATENTS

| | | | |
|---|---|---|---|
| 3,034,988 | 5/1962 | Ingraham et al. | 252—62.51 |
| 3,117,093 | 1/1964 | Arthur et al. | 23—145 |
| 3,278,263 | 10/1966 | Cox | 23—145 |

| | | | |
|---|---|---|---|
| 2,956,955 | 10/1960 | Arthur. | |
| 3,068,176 | 12/1962 | Ingraham et al. | |
| 3,074,778 | 1/1963 | Cox. | |

OSCAR R. VERTIZ, Primary Examiner

HOKE S. MILLER, Assistant Examiner

U.S. Cl. X.R.

252—62.51